Sept. 7, 1943.  J. MARTIN  2,328,987
JOINT FOR ENGINE MOUNTINGS AND LIKE PURPOSES
Filed Jan. 19, 1942   2 Sheets-Sheet 2
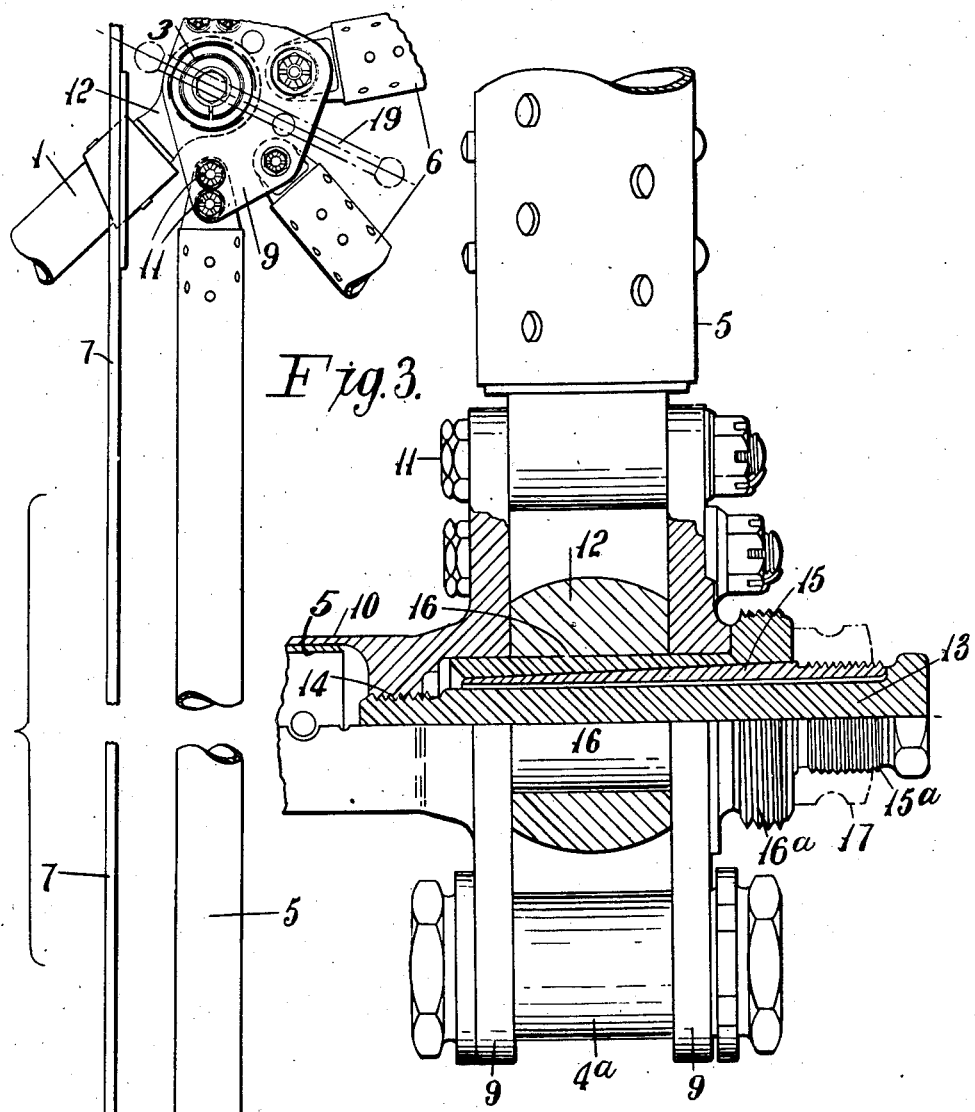
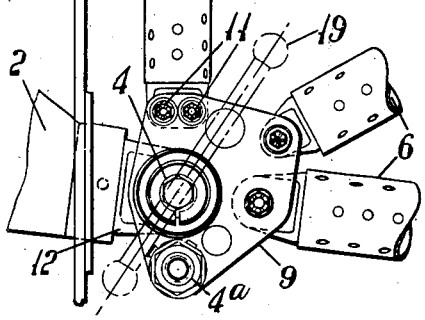
Inventor.
J. MARTIN
By Rayner & Co
Attorneys.

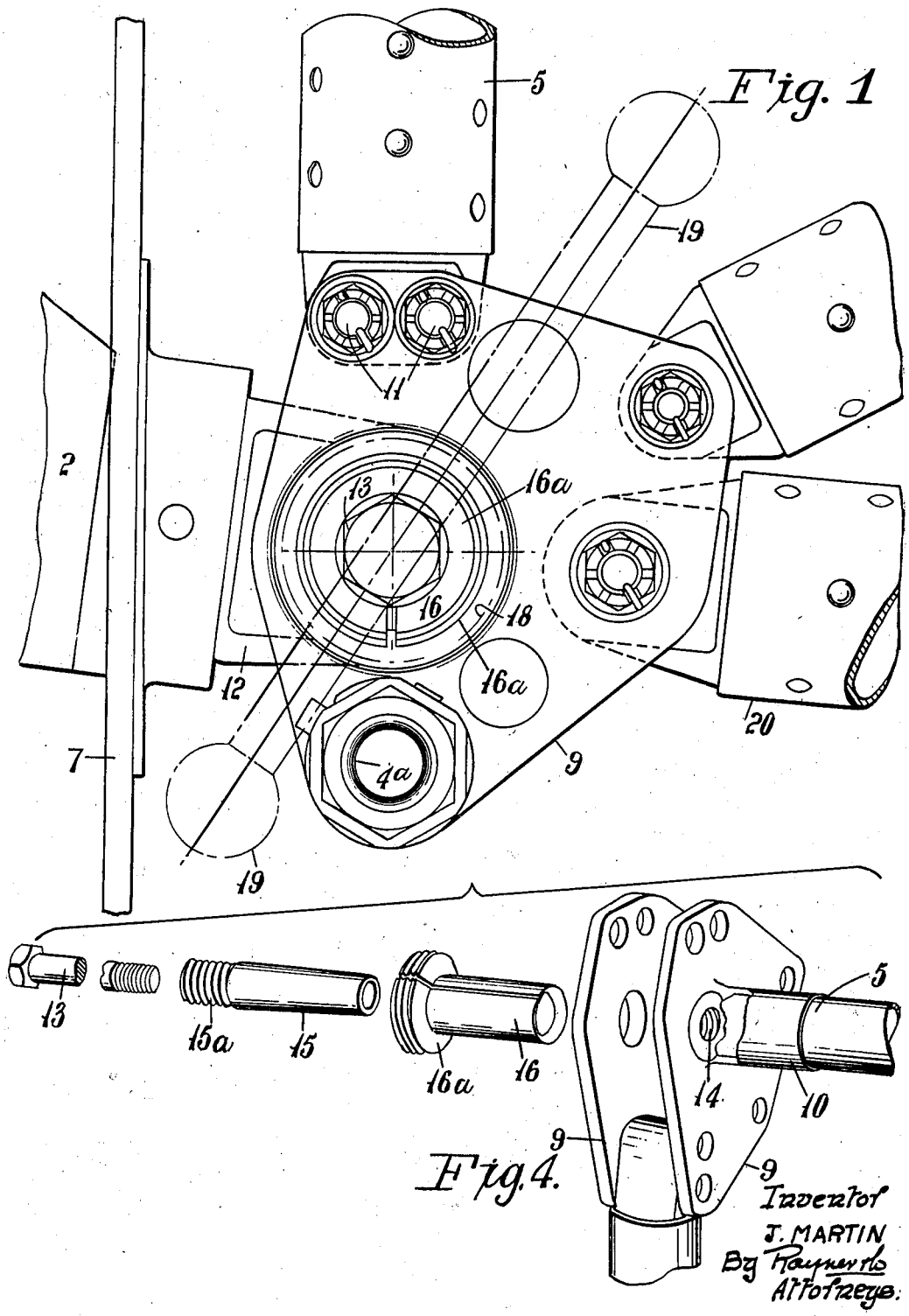

Patented Sept. 7, 1943

2,328,987

UNITED STATES PATENT OFFICE 2,328,987

JOINT FOR ENGINE MOUNTINGS AND LIKE PURPOSES

James Martin, Higher Denham, near Uxbridge, England

Application January 19, 1942, Serial No. 427,302
In Great Britain February 11, 1941

8 Claims. (Cl. 248—5)

This invention relates to joints for engine mountings and for like purposes where it is desired to carry a heavy body which imparts vibrational, torsional or other strains to the supporting medium, such as e. g. occur in the mounting of aircraft engines. The invention is particularly useful in connection with the latter form of mounting as it is primarily concerned with a form of joint which can be readily fitted to take a heavy load and adjusted to take up say slack and to remedy any slight misalignment that can occur in frame and other coupled elements which are adapted to be connected so that they may be readily disassembled, this being a desideratum in present day aircraft practice where the engine, sometimes with a bulkhead, is required to be removed and mounted as a unit. The primary object of the invention is to provide a coupling or joint effecting device which whilst being easy to fit and remove, will firmly connect the appropriate elements so as to obviate any play or slackness at the joint and also will obviate the necessity of extremely accurate machining and alignment of the coupled parts thereby facilitating manufacture as well as the mounting of engines and other heavy bodies. Another object of this invention is to provide a form of joint for the mounting of engines on aircraft frames and the like in which a very close fit is effected automatically as a bolt or like center member is fitted in position to connect frame or other members.

According to this invention a joint device for connecting frame and other members comprises a split sleeve to be fitted into the members to be joined, an expander fitted in the split sleeve and means for displacing the expander axially to expand the split sleeve in the members to be joined.

The preferred form of the present invention takes the form of a joint device suitable for connecting an engine mounting involving a frame composed of struts or arms, to a frame section of a fuselage, nacelle or wing of an aeroplane, and in which plates, furcations, lugs or flanges of struts or the like receive between them one end of another strut or the like and a bolt is passed through such elements to couple them. The bolt can be threaded at one end into a boss or socket on, or in, one of the elements or can receive a nut to tighten it in position, and the head of this bolt abuts against one end of a sleeve loose on the bolt and having a tapered periphery which wedges into a locking sleeve which is split longitudinally and is expanded by the wedging action of the tapered sleeve against the elements to be coupled. The two sleeves are both threaded at one end, the tapered sleeve to receive a nut and the split sleeve to receive a tool, specially provided for extracting the sleeves, the nut being temporarily fitted on the tapered sleeve after the bolt has been removed.

In order that the present invention may be clearly understood and readily carried into effect drawings are appended hereto illustrating an embodiment thereof as adapted to an engine mounting of an aeroplane, and wherein, Fig. 1 is a broken side elevation view showing a joint at the lower part of a rectangular engine mounting frame at the end of a fuselage.

Fig. 2 is a broken half-sectional front elevation view of Fig. 1.

Fig. 3 is a side elevation view to a smaller scale showing the said engine mounting frame, and Fig. 4 is a detail view showing in perspective a set of the joint elements disassembled from the appropriate frame part.

Referring to the drawings the engine mounting is shown by way of example as comprising two upper and two lower arms 1 and 2 respectively, readily detachably connected by upper and lower joints 3 and 4 respectively (see Fig. 3) to a quadrilateral arrangement of struts or frame members 5 of the engine supporting end of a fuselage frame 6, the engine being carried by suitable bearers or other means on the arms 1 and 2 or extensions thereof.

The said joints, which comprise the more important part of the present invention afford a means for readily removing the engine and its mounting together with a bulkhead 7 as a unit from the fuselage, and they also enable any slack to be taken up when attaching the engine mounting units 1 and 2 to the fuselage, and at the same time being adjustable to compensate for any slight misalignment of the engine mounting and fuselage parts to be connected. The joints can each include a parallel pair of side plates or brackets 8 and 9, the inner ones 8 of which can be formed with bosses 10 which receive the cross members of the quadrilateral frame 5, the vertical members of this frame being secured by bolts 11 between the side plates 8 and 9. The engine mounting arms 1 and 2 are formed with plug ends 12 which are located between the appropriate pairs of plates 8 and 9 and secured by the special form of joints.

The joints each include a central bolt 13 which can be threaded into the solid inner end of the adjacent boss 10 which is provided with a threaded bore 14 for such purpose. Alternatively, in certain arrangements a nut can be threaded on to the bolt to secure it in position. Loosely surrounding each bolt is an externally tapered sleeve 15 the purpose of which is to wedge into a split outer sleeve 16 which engages directly in the appropriate plug end 12. It will be apparent that by axial pressure upon the outer end of the tapered sleeve 15 that the split sleeve 16 will be expanded tightly against the bore of the plug end 12 and thereby any play between, or misalignment of, the connected parts will be taken care of by the split sleeve, thereby ensuring a rattle-free and solid connection of the engine mounting to the fuselage frame.

The said axial pressure upon the tapered sleeve is effected automatically as the bolt 13 is threaded home into the boss 10, by reason of the head of the bolt abutting against the outer end of the tapered sleeve.

The split sleeve 16 is an easy fit in the side plates or brackets 8 and 9 and the plug end 12 before the tapered sleeve is forced home, and consequently removal of the bolt 13 and the extraction of the tapered sleeve 15 will free the split sleeve for extraction. The removal of the tapered sleeve 15 is effected by threading an "extractor" nut 17 on to a threaded outer end part 15a of the tapered sleeve, this nut, as it is rotated by a spanner, abutting against an annular head 16a of the split sleeve and consequently traversing the tapered sleeve outwardly until it is sufficiently loose to be pulled out by hand.

The split sleeve 16 can be removed by an extractor tool in the form of a tube (indicated by the broken lines 18 in Fig. 1) threaded internally at one end to thread upon the threaded periphery of the annular head 16a, this tube being abutted against the adjacent side plate 9 and rotated by a tommy bar (indicated by the broken lines 19) until the sleeve is extracted by the feeding action of the engaging threads.

The side plates 8 and 9 can comprise integral bifurcated ends of the appropriate frame members or separately attached elements as shown. The lower ones thereof can have secured across them hollow bolts 4a for undercarriage attachments, and also struts 5 and longitudinal fuselage members 20 can be bolted between them.

The form of joint shown is particularly advantageous with an engine mounting carrying a bulkhead as shown because the bulkhead is close to the fuselage end and entirely screens the engine so that the making and disassembling of the joints by manipulation at one side only of the fuselage frame for each joint effects a considerable saving in time and ensures accuracy and solidity in the finished assembly, the tapered and split sleeves assisting in the correct location and alignment of the connected frame and mounting elements. It also has the advantage that there is no necessity to have covered openings or recesses in the bulkhead for access to the joints.

I claim:

1. A point forming device for connecting an engine mounting or other like structure to a fuselage frame and for like purposes comprising a bolt adapted to be passed through the parts to be connected, a tapered sleeve surrounding the bolt, a split sleeve receiving the tapered sleeve and bolt and adapted to fit closely in the connected parts, opposed abutment surfaces on the tapered sleeve and bolt adapted to engage when the bolt is being secured in position to effect axial displacement of the tapered sleeve, whereby the split sleeve is expanded against the connected parts, and a threaded outer end part on said tapered sleeve adapted to receive extracting means.

2. A joint forming device for connecting an engine mounting or other like structure to a fuselage frame and for like purposes comprising a split sleeve to be fitted into the members of the mounting and frame or the like to be joined, an expander fitted into the split sleeve, a central bolt for displacing the expander axially to expand the sleeve in the members to be joined, a pair of side plates on one of the members to be joined adapted to receive between themselves the other of the members to be joined, and a threaded bore in one of said side plates to receive the threaded end of said bolt.

3. A joint forming device for connecting an engine mounting or other like structure to a fuselage frame and for like purposes comprising a bolt adapted to be passed through the parts to be connected, a tapered sleeve surrounding the bolt, a split sleeve receiving the tapered sleeve and bolt and adapted to fit closely in the connected parts, opposed abutment surfaces on the tapered sleeve and bolt adapted to engage when the bolt is being secured in position to effect axial displacement of the tapered sleeve, whereby the split sleeve is expanded against the connected parts, threaded outer end parts on said sleeves adapted to receive extracting means, a pair of side plates on one of the mounting or frame parts to be joined adapted to receive between themselves the other of the mounting or frame parts to be joined, and a threaded bore in one of said side plates to receive the threaded end of said bolt.

4. A joint forming device for connecting an engine mounting or other like structure to a fuselage frame and for like purposes comprising a split sleeve to be fitted into the members of the mounting and frame or the like to be joined, an expander fitted into the split sleeve, a central bolt for displacing the expander axially to expand the sleeve in the members to be joined, a pair of side plates on one of the members to be joined adapted to receive between themselves the other of the members to be joined, and a threaded bore in one of said plates to receive the threaded end of said bolt, one end of each of the said bolt, split sleeve and expander being exposed in proximity to each other for engagement by removing and affixing tools beyond an outer face of one of said plates.

5. A joint forming device for connecting an engine mounting or other like structure to a fuselage frame and for like purposes comprising a split sleeve to be fitted into the members of the mounting and frame or the like to be joined, an expander fitted into the split sleeve, a central bolt for displacing the expander axially to expand the sleeve in the members to be joined, a pair of side plates on one of the members to be joined adapted to receive between themselves the other of the members to be joined, a boss formed on the outer face of one of said side plates adapted to receive a frame member, and a threaded bore in said boss adapted to receive the threaded end of said bolt.

6. A joint forming device for connecting an engine mounting or other like structure to a fuselage frame and for like purposes comprising a bolt adapted to be passed through the parts to be connected, a tapered sleeve surrounding the bolt, a split sleeve receiving the tapered sleeve and bolt and adapted to fit closely in the connected parts, opposed abutment surfaces on the tapered sleeve and bolt adapted to engage when the bolt is being secured in position to effect axial displacement of the tapered sleeve, whereby the split sleeve is expanded against the connected parts, threaded outer end parts on said sleeves adapted to receive extracting means, a pair of side plates on one of the mounting or frame parts to be joined adapted to receive between themselves the other of the mounting or frame parts to be joined, a boss formed on the outer face of one of said side plates adapted to receive a frame member, and a threaded bore in said boss adapted to receive the threaded end of said bolt.

7. An aeroplane engine mounting comprising an engine frame, a fixed frame to which the engine frame is to be attached, joints for effecting said attachment, each joint comprising a split sleeve to be fitted into opposed parts of the two frames to be joined, an expander fitted into the split sleeve, a central bolt for displacing the expander axially, a pair of furcations on one of such opposed parts to be joined receiving between themselves the other of said parts, a threaded bore in one of said furcations receiving the threaded end of the bolt, and a bulkhead fitted to the parts of the engine frame which are connected by said joints to the said fixed frame.

8. A joint forming device for connecting an engine mounting or other like structure to a fuselage frame and for like purposes comprising a bolt adapted to be passed through the parts to be connected, a tapered removable sleeve open at both ends and surrounding the bolt, said bolt extending through said sleeve and adapted to be threaded into a fixed abutting member of the fuselage frame, a split sleeve receiving the tapered sleeve and bolt and adapted to fit closely in the connected parts, opposed smooth contacting surfaces on the tapered sleeve and bolt adapted to slide upon each other when the bolt is being secured in position to effect axial displacement of the tapered sleeve, whereby the split sleeve is expanded against the connected parts.

JAMES MARTIN.